United States Patent
Tsirkin

(10) Patent No.: US 10,445,126 B2
(45) Date of Patent: Oct. 15, 2019

(54) PRELOADING ENHANCED APPLICATION STARTUP

(71) Applicant: Red Hat, Inc., Raleigh, NC (US)

(72) Inventor: Michael Tsirkin, Lexington, MA (US)

(73) Assignee: RED HAT, INC., Raleigh, NC (US)

( * ) Notice: Subject to any disclaimer, the term of this patent is extended or adjusted under 35 U.S.C. 154(b) by 96 days.

(21) Appl. No.: 15/438,132

(22) Filed: Feb. 21, 2017

(65) Prior Publication Data

US 2018/0239624 A1  Aug. 23, 2018

(51) Int. Cl.
*G06F 9/455* (2018.01)
*G06F 9/445* (2018.01)

(52) U.S. Cl.
CPC .......... *G06F 9/45558* (2013.01); *G06F 9/445* (2013.01); *G06F 9/44563* (2013.01); *G06F 9/44521* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,223,202 B1* | 4/2001 | Bayeh ................... | G06F 9/5027 718/1 |
| 7,584,473 B2 | 9/2009 | Forin et al. | |
| 7,908,593 B2 | 3/2011 | Arnold et al. | |
| 8,224,971 B1* | 7/2012 | Miller ................. | H04L 12/4641 370/254 |
| 8,261,268 B1* | 9/2012 | Forgette .............. | G06F 9/45558 718/1 |
| 8,291,503 B2* | 10/2012 | Hamid ................ | G06F 9/44521 712/248 |
| 8,321,850 B2 | 11/2012 | Bruening et al. | |
| 8,914,626 B1* | 12/2014 | Adogla ................. | G06F 9/4401 713/2 |
| 9,626,212 B2* | 4/2017 | Beveridge ............. | G06F 16/273 |
| 9,678,769 B1* | 6/2017 | Scott ........................ | G06F 9/455 |
| 9,694,276 B2* | 7/2017 | Stine ....................... | A63F 13/12 |
| 9,811,544 B1* | 11/2017 | Taylor ............... | G06F 17/30309 |
| 2003/0227892 A1* | 12/2003 | Cabana ................. | H04W 88/16 370/338 |

(Continued)

OTHER PUBLICATIONS

Hund et al., Practical Timing Side Channel Attacks Against Kernel Space ASLR, 2013 IEEE Symposium on Security and Privacy (15 pages).

(Continued)

*Primary Examiner* — Abu Zar Ghaffari
(74) *Attorney, Agent, or Firm* — K&L Gates LLP

(57) ABSTRACT

Preloading enhanced application startup is disclosed. For example, a first local socket associated with a first copy of an executable program loaded in a memory receives a first instruction to launch a second copy of the executable program. The executable program executes in one of two modes, a server mode and an active mode, and the first copy of the executable program executes in the server mode. The first copy of the executable program is cloned to launch the second copy of the executable program, which is launched in the active mode. A third copy of the executable program associated with a second local socket is launched in the server mode. The third copy of the executable program is determined to be actively running, after which the first copy of the executable program is terminated.

19 Claims, 5 Drawing Sheets

(56) References Cited

U.S. PATENT DOCUMENTS

| | | | | |
|---|---|---|---|---|
| 2006/0059473 A1* | 3/2006 | Moler | G06F 8/45 | 717/149 |
| 2007/0174410 A1* | 7/2007 | Croft | G06F 3/1415 | 709/208 |
| 2009/0094610 A1* | 4/2009 | Sukirya | G06F 9/5083 | 718/105 |
| 2009/0300076 A1* | 12/2009 | Friedman | G06F 11/3664 | |
| 2010/0030998 A1 | 2/2010 | Kiriansky | | |
| 2010/0235831 A1* | 9/2010 | Dittmer | G06F 9/45558 | 718/1 |
| 2011/0093849 A1* | 4/2011 | Chawla | H04L 41/0816 | 718/1 |
| 2011/0219113 A1* | 9/2011 | Grewal | G06F 15/16 | 709/224 |
| 2012/0324481 A1* | 12/2012 | Xia | G06F 9/485 | 719/320 |
| 2013/0262801 A1* | 10/2013 | Sancheti | G06F 3/065 | 711/162 |
| 2014/0094315 A1 | 4/2014 | Stine et al. | | |
| 2014/0168698 A1* | 6/2014 | Okada | G06F 3/1236 | 358/1.15 |
| 2014/0188971 A1* | 7/2014 | Aahlad | H04L 67/10 | 709/201 |
| 2014/0373005 A1* | 12/2014 | Agrawal | G06F 9/45533 | 718/1 |
| 2015/0033228 A1* | 1/2015 | Lee | G06F 9/45533 | 718/1 |
| 2015/0149980 A1* | 5/2015 | Zhong | G06F 8/20 | 717/105 |
| 2015/0199532 A1* | 7/2015 | Ismael | G06F 21/552 | 726/30 |
| 2015/0229645 A1* | 8/2015 | Keith | H04L 41/50 | 726/4 |
| 2016/0248875 A1* | 8/2016 | Frerking | G06F 11/2023 | |
| 2017/0115994 A1* | 4/2017 | Goodman | G06F 9/445 | |

OTHER PUBLICATIONS

6 Managing Virtual Machines, Copyright 2008-2009 Oracle Link. docs.oracle.com/cd/E15458_01/doc.22/e15441/vm.htm.

Timekeeping in VMware Virtual Machines, Copyright 1998-2005 VMware, Inc. Link: cse.psu.edu/~buu1/teaching/spring06/papers/vmware-timing.pdf.

\* cited by examiner

PRELOADING ENHANCED APPLICATION STARTUP

BACKGROUND

The present disclosure generally relates to starting executable programs in computer systems. Many typical executable programs incorporate shared libraries to perform various tasks for a variety of reasons, including ease of development, compliance with standards, and reusability of code. A significant part of loading an executable program for execution includes the loading of the shared libraries incorporated in the executable program. The shared libraries typically provide a lot of the features needed for the executable program to perform its designed tasks.

SUMMARY

The present disclosure provides a new and innovative system, methods and apparatus for preloading enhanced application startup. In an example, a first local socket associated with a first copy of an executable program loaded in a memory receives a first instruction to launch a second copy of the executable program. The executable program executes in one of two modes, a server mode and an active mode, and the first copy of the executable program executes in the server mode. The first copy of the executable program is cloned to launch the second copy of the executable program which is launched in the active mode. A third copy of the executable program associated with a second local socket is launched in the server mode. The third copy of the executable program is determined to be actively running, after which the first copy of the executable program is terminated.

Additional features and advantages of the disclosed method and apparatus are described in, and will be apparent from, the following Detailed Description and the Figures.

DETAILED DESCRIPTION OF EXAMPLE EMBODIMENTS

Figure 1:
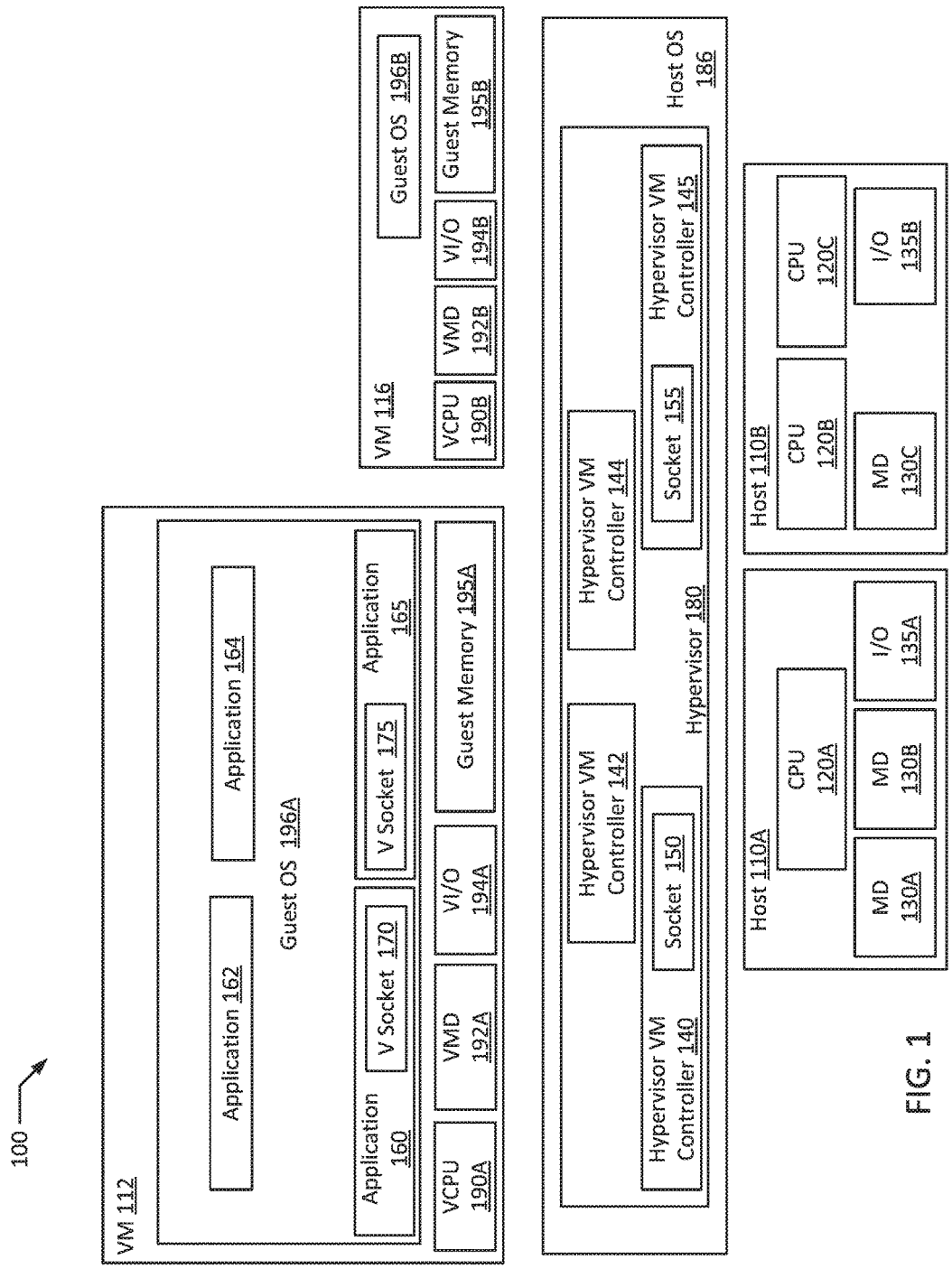
FIG. 1 is a block diagram of a system employing preloading enhanced application startup according to an example of the present disclosure.

In computer systems, executable programs are typically built by incorporating multiple shared libraries into a binary executable file, the shared libraries generally being loaded to Random Access Memory ("RAM") prior to executing code in the shared libraries. The aggregate size of the shared libraries incorporated in an executable program tends to impact the time required for the executable program to start. In part because these shared libraries tend to comprehensively cover functionality of a particular type (e.g., network transmissions or support for a particular programming language), shared libraries tend to include more features than a particular executable program incorporating the shared library need. A result is that loading shared libraries into memory tends to account for a significant amount of the startup time for an executable program. The share of the startup time for an executable program that loading shared libraries represents depends in part on the quantity and the size of the shared libraries incorporated. In some systems, shared libraries may be loaded into RAM in a fixed location, with executable programs linking themselves to the copy of the shared library already loaded in RAM upon launch rather than loading a separate copy of the shared library. By maintaining a list of reference locations in the memory for these previously loaded shared libraries, startup times for executable programs such as applications may be significantly improved. However, with these types of optimizations using static locations for shared libraries in the memory, there are increased security risks for the system because enforcing static memory locations disables security features such as address space layout randomization ("ASLR").

A commonly exploited security flaw in computer systems relates to exploiting buffer overflow events. A malicious actor may purposefully over run a fixed sized buffer to place data in an area in memory that should not have been accessible to the malicious actor's programming. If the location in memory of certain routinely used libraries is discoverable, return addresses in the call stack of the library may be replaced with a pointer to an address of alternative code placed in memory by the malicious actor. A typical scenario may involve discovering the location in memory of a shared library executing with higher privileges than the malicious actor has been able to obtain access to on the computer system, and then to redirect certain common functionality of the library to replacement code of the malicious actor's choosing by deliberately triggering a buffer overflow event that overflows onto the privileged library from a non-privileged location in memory. ASLR impedes these types of attacks by randomizing the locations in memory for shared libraries and parts of shared libraries each time an executable program is loaded into memory. However, in systems where one copy of a shared library is preloaded into the memory at a static location which is then "prelinked" to each new executable program referencing the shared library, ASLR cannot function because the shared library is not being reloaded to a random location. A malicious actor may then discover the location in memory of a shared library that is commonly used with elevated rights (e.g., libc, a library for generating the runtime environment for code written in the c programming language commonly used in operating system components), and use that location information target memory addresses for an attack. Due to the conflict between "prelinking" and ASLR, administrators of computer systems generally have to choose between faster performance in the form of faster application loading from implementing a "prelinking" style of preloading shared libraries in memory versus higher security against attack by implementing ASLR.

The present disclosure aims to address the balance between loading time and security concerns by employing a novel method of preloading enhanced application startup. In an example, embodiments of the present disclosure enables for executable programs to be loaded with active ASLR while still having the shared libraries required by the executable programs be preloaded to the system memory. By first loading a first copy of the executable program in a standby/server mode with ASLR active, it is possible for subsequent requests to execute the executable program to reference the shared libraries loaded to memory by the first copy of the executable program. Rather than sharing one copy of the shared library across an entire system using a static location for that shared library, copies of the shared library are shared instead by copies of the same program limiting the impact of a discovery of the location in memory of a shared library referenced by any one executable program. Furthermore, preferential embodiments of the present disclosure additionally increase security by re-performing ASLR of the server mode version of the executable program, thereby preventing stack overflow exploits targeting the impacted executable programs. Although the presently disclosed system incurs the overhead of executing at least one extra copy of the executable program, results from the present system's advantageous combination of speed and security justify the overhead. In addition, the amount of overhead can be tuned such that the actual overhead incurred would be less than the memory requirements of an operating additional full instance of the executable program. In some examples, storage space usage and memory I/O time may be further optimized by using a copy on write method for launching active mode versions of the executable program, such that only changes to what has previously been loaded to memory by the server mode copy of the executable program need to be written, unchanged data may instead be read and shared from the original copy loaded to memory.

FIG. 1 is a block diagram of a system employing preloading enhanced application startup according to an example of the present disclosure. The system 100 may include one or more interconnected hosts (e.g., hosts 110A-B). Each host 110A-B may in turn include one or more physical processors (e.g., CPU 120A-C) communicatively coupled to memory devices (e.g., MD 130A-C) and input/output devices (e.g., I/O 135A-B). As used herein, physical processor or processors (Central Processing Units "CPUs") 120A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 135A-B refers to a device capable of providing an interface between one or more processor pins and an external device, the operation of which is based on the processor inputting and/or outputting binary data. CPUs 120A-C may be interconnected using a variety of techniques, ranging from a point-to-point processor interconnect, to a system area network, such as an Ethernet-based network. Local connections within each host 110A-B, including the connections between a processor 120A and a memory device 130A-B and between a processor 120A and an I/O device 135A may be provided by one or more local buses of suitable architecture, for example, peripheral component interconnect (PCI).

In computer systems (e.g., system 100), it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a virtual machine ("VM") (e.g., VMs 112 and 116) may be a robust simulation of an actual physical computer system utilizing a hypervisor to allocate physical resources to the virtual machine.

In an example, hosts 110A-B may run one or more isolated guests in the form of virtual machines VM 112 and VM 116, by executing a software layer (e.g., hypervisor 180) above the hardware and below the VMs 112 and 116, as schematically shown in FIG. 1. In an example, the hypervisor 180 may be components of the host operating system 186 executed by the system 100. In another example, the hypervisor 180 may be provided by an application running on host operating system 186, or may run directly on the hosts 110A-B without an operating system beneath it. The hypervisor 180 may virtualize the physical layer, including processors, memory, and I/O devices, and present this virtualization to VMs 112 and 116 as devices, including virtual processors ("VCPUs") 190A-B, virtual memory devices ("VMDs") 192A-B, virtual I/O devices ("VI/Os") 194A-B, and/or guest memory 195A-B. In an example, a VM 112 may be a virtual machine and may execute a guest operating system ("OS") 196A which may utilize the underlying virtual central processing unit ("VCPU") 190A, virtual memory device ("VMD") 192A, and virtual input/output ("VI/O") devices 194A. Processor virtualization may be implemented by the hypervisor 180 scheduling time slots on one or more physical processors 120A-C such that from the guest operating system's perspective those time slots are scheduled on a virtual processor 190A.

A VM 112 may run on any type of dependent, independent, compatible, and/or incompatible applications on the underlying hardware and host operating system 186. In an example, guest OS 196A and applications 162 and 164 running on VM 112 may be independent of the underlying hardware and/or host operating system 186. Additionally, guest OS 196A and applications 162 and 164 running on VM 112 may be incompatible with the underlying hardware and/or host operating system 186. The hypervisor 180 manages memory for the host operating system 186 as well as memory allocated to the VM 112 and guest operating system 196A such as guest memory 195A provided to guest OS 196A. In an example, VM 116 may be another virtual machine similar in configuration to VM 112, with VCPU 190B, VMD 192B, VI/O 194B, guest memory 195B, and guest OS 196B operating in similar roles to their respective counterparts in VM 112. In some examples, various components of system 100, for example, host 110A and host 110B may reside over a network from each other, which may be, for example, a public network (e.g., the Internet), a private network (e.g., a local area network (LAN) or wide area network (WAN)), or a combination thereof.

In an example, hypervisor 180 may include a hypervisor virtual machine controller (e.g., hypervisor virtual machine controllers 140, 142, 144, and 145). Hypervisor virtual machine controllers 140, 142, 144, and 145 are executable programs performing part of the tasks of hypervisor 180 executing in the user space of hosts 110A-B. In an example, a hypervisor virtual machine controller (e.g., hypervisor virtual machine controller 142 and 144) may be a stand alone executable program associated with hypervisor 180. In an example, hypervisor virtual machine controller 142 may be a component part of hypervisor 180. In another example, a hypervisor virtual machine controller may function as a stand alone hypervisor. In an example, each of hypervisor virtual machine controllers 142 and 144 may be associated with a respective virtual machine (e.g., VMs 112 and 116), and may provide VM specific configuration settings and configuration capabilities for a particular VM. In an example, hypervisor virtual machine controller 142 may be associated with VM 112, and hypervisor virtual machine controller 144 may be associated with VM 116. In an example of preloading enhanced application startup, hypervisor virtual machine controllers 140 and 145 may be in a passive server mode providing fast startup for other copies of the hypervisor virtual machine controller executable program (e.g., hypervisor virtual machine controllers 142 and 144). In an example, hypervisor virtual machine controllers 142 and 144 may be in an active mode performing the programmed function of a hypervisor virtual machine controller by providing configurations for VMs 112 and 116. In an example, while in server mode, hypervisor virtual machine controller 140 listens for instructions on socket 150 while hypervisor virtual machine controller 145 listens for instructions on socket 155. In an example, sockets 150 and 155 may be any form of communication channel by which hypervisor virtual machine controllers 140 and 145 may listen for instructions. In an example, sockets 150 and 155 may be operating system components (e.g., UNIX® domain sockets) implemented, for example, through sharing access to a particular area of the file system of system 100 between various parties in a communication. In another example, sockets 150 and 155 may be implemented as a network socket using Internet Protocol ("IP"), Transmission Control Protocol ("TCP"), User Datagram Protocol ("UDP") or any other protocol. In an example, sockets 150 and 155 may be ports accessible to external systems.

In an example, Applications 160, 162, 164 and 165 represent a second executable program performing preloading enhanced application startup within VM 112. In the example, application 160 and application 165 may be server mode copies of the second executable program, while application 162 and application 164 may be active mode copies of the second executable program. In an example, application 160 listens for instructions over virtual socket 170 and application 165 listens for instructions over virtual socket 175. In an example, applications 160, 162, 164, and 165 may be unaware that they are executing within a virtualized environment. Virtual sockets 170 and 175 may be any form of communicative channel through which server mode copies of the executable program (e.g., application 160 and application 165) may receive instructions to launch active mode copies of the executable program (e.g., application 162 and application 164). The applications 160, 162, 164, and 165 may be any executable program that benefits from preloading enhanced application startup, including, for example, a compiler or runtime environment.

Figure 2:
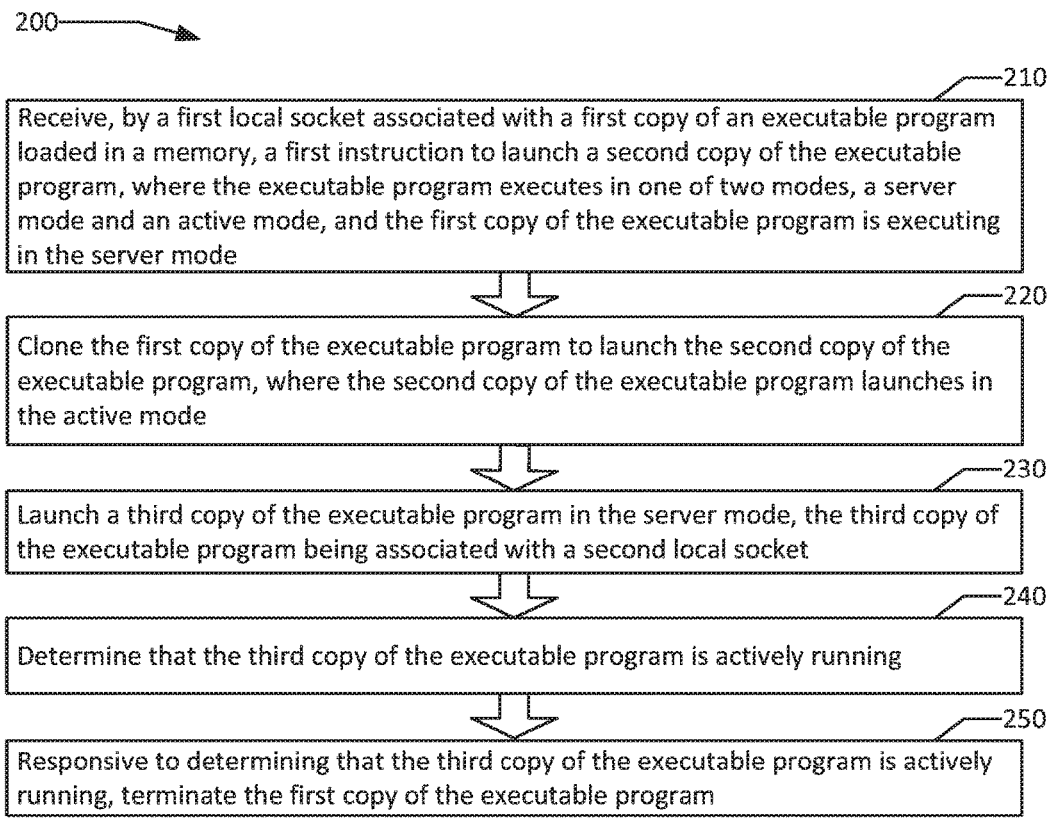
FIG. 2 is a flowchart illustrating an example of preloading enhanced application startup according to an example of the present disclosure.

FIG. 2 is a flowchart illustrating an example of preloading enhanced application startup according to an example of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both. In an example, the method is performed by an executable program in the form of hypervisor virtual machine controller 140.

The example method 200 may begin with receiving, by a first local socket associated with a first copy of an executable program loaded in a memory, a first instruction to launch a second copy of the executable program, where the executable program executes in one of two modes, a server mode and an active mode, and the first copy of the executable program is executing in the server mode (block 210). In an example, hypervisor virtual machine controller 140 is executing in the server mode, where rather than performing the designed tasks for a hypervisor virtual machine controller (e.g., providing a VM with configuration settings), the hypervisor virtual machine controller 140 preloads shared libraries used by hypervisor virtual machine controllers and listens for further instructions on socket 150. In an example, hypervisor virtual machine controller 140 may be launched as part of a startup routine of system 100. In an example, launching hypervisor virtual machine controller 140 may include loading hypervisor virtual machine controller 140 to memory device 130A, including shared libraries incorporated in hypervisor virtual machine controller 140. Launching hypervisor virtual machine controller 140 may also include binding socket 150 to hypervisor virtual machine controller 140 to listen for instructions. In another example, hypervisor virtual machine controller 140 may be launched in response to a request to launch a hypervisor virtual machine controller (e.g., a request to start a new hypervisor virtual machine controller or a request to launch a new VM). In an example, launching hypervisor virtual machine controller 140 includes performing address space layout randomization for the memory used by hypervisor virtual machine controller 140. In an example, socket 150 is identified and associated with the executable program (e.g., a hypervisor virtual machine controller) in a configuration file, an environment value, a path, or another suitable form of storage from which the socket to executable program relationship may be quickly retrieved. In an example, socket 150 may be any form of communication channel by which hypervisor virtual machine controller 140 may listen for instructions, including but not limited to a socket, a port, a queue, a file, or a shared file storage space. In an example, hypervisor virtual machine controller 140 may receive an instruction through socket 150 to launch hypervisor virtual machine controller 142. In an example, the hypervisor 180 may send the instruction to socket 150 in response to receiving a request for a new VM 112.

The first copy of the executable program is cloned to launch the second copy of the executable program, where the second copy of the executable program launches in the active mode (block 220). In an example, hypervisor virtual machine controller 140 may clone itself to launch hypervisor virtual machine controller 142 in the active mode. In an example, the instructions received by hypervisor virtual machine controller 140 may further include arguments and environment settings for hypervisor virtual machine controller 142. For example, argv and env values may be set for hypervisor virtual machine controller 142 by hypervisor virtual machine controller 140. In an example, cloning hypervisor virtual machine controller 140 may be achieved through the execution of commands such as clone( ) fork( ) spawn( ) or CreateProcess( ) In such examples, cloning methods that additionally support copy on write may be additionally advantageous due to further reduced loading of shared libraries, for example, by allowing hypervisor virtual machine controller 140 and hypervisor virtual machine controller 142 to share the same copy of a shared library until a change is required to be written to the memory block where the shared library is contained by either copy of the executable program, at which time the copy making the change would write to its own new memory block. In some embodiments, it has been demonstrated that cloning an already running copy of a hypervisor virtual machine controller is at least five percent faster than launching a hypervisor virtual machine controller directly. In an example system where a hypervisor virtual machine controller takes 200 to 300 ms to load, preloading enhanced application startup was able to consistently reduce load times by 10 to 15 ms. Larger savings may be observed depending on the quantity and/or size of the shared libraries integrated into a particular executable program. Therefore, on systems hosting dozens of virtual machines, the additional memory usage overhead of keeping hypervisor virtual machine controller 140 in server mode occupies a significantly lower percentage of the total available memory capacity of the system than the performance gain. In some examples, where no hypervisor virtual machine controller is currently running, the instruction to launch hypervisor virtual machine controller 142 may be reinterpreted by the hypervisor 180 to be two instructions, a first instruction to launch hypervisor virtual machine controller 140 in server mode, and a second instruction to launch hypervisor virtual machine controller 142 in active mode by cloning hypervisor virtual machine controller 140.

In an example, hypervisor virtual machine controller 140 may launch with elevated rights, for example, to allow the server mode version of the executable program to act as a server for all users of the system. In such an example, part of the instructions to launch hypervisor virtual machine controller 142 may include user settings, and the hypervisor virtual machine controller 140 may temporarily assume the rights and environment settings of a less privileged user prior to cloning itself to launch hypervisor virtual machine controller 142.

In an example, hypervisor virtual machine controller 140 preloads some or all of the shared libraries used by active mode hypervisor virtual machine controllers prior to launching any active mode hypervisor virtual machine controllers (e.g., hypervisor virtual machine controller 142 and hypervisor virtual machine controller 144). In some examples, hypervisor virtual machine controller 140 may also pre-initialize the shared libraries in addition to preloading the shared libraries. A determination on whether to pre-initialize a certain shared library may be based on environment settings, environment values, user settings, or configuration settings. Pre-initializing may provide further performance gains at the cost of some additional overhead. However, different copies of active mode hypervisor virtual machine controllers may require initialization of various shared libraries with different settings, so pre-initialization may actually be disadvantageous in some cases if re-initialization is required due to differences in settings.

A third copy of the executable program is launched in the server mode, the third copy of the executable program being associated with a second local socket (block 230). In an example, hypervisor virtual machine controller 145 is launched in server mode listening on socket 155. Hypervisor virtual machine controller 145 may be launched, including performing address space layout randomization, in response to an elapsed time since the launch of hypervisor virtual machine controller 140 or after hypervisor virtual machine controller 140 clones itself a set number of times to launch active mode hypervisor virtual machine controllers (e.g., hypervisor virtual machine controllers 142 and 144). In an example, hypervisor virtual machine controller 145 may be launched to refresh ASLR for hypervisor virtual machine controllers because cloning, especially using copy on write, would not change the address space locations for the child processes of hypervisor virtual machine controller 140 (e.g., hypervisor virtual machine controllers 142 and 144).

The example method 200 may continue with determining that the third copy of the executable program is actively running (block 240). In an example, hypervisor virtual machine controller 140 determines whether hypervisor virtual machine controller 145 is actively running and ready to replace hypervisor virtual machine controller 140 as the server for launching hypervisor virtual machine controllers. For example, hypervisor virtual machine controller 140 may test socket 155 to determine if socket 155 is actively listening. In an example, hypervisor virtual machine controller 140 sends a test message to socket 155 and awaits an acknowledgement of the test. In an example, socket 150 and socket 155 are different, unique sockets. In such examples, hypervisor 180, when sending instructions to launch a new hypervisor virtual machine controller, may first try socket 150 and then try 155 if socket 150 is unresponsive, for example, if socket 150 fails to acknowledge the instruction. Alternatively, hypervisor 180 may send the instructions to both socket 150 and socket 155 and await the first acknowledgement. In such an example, hypervisor 180 may then cancel the request to the other socket. In another example, socket 150 and socket 155 may be a shared socket between hypervisor virtual machine controller 140 and hypervisor virtual machine controller 145. In such an example, hypervisor 180 would only have a single destination to send its requests for new hypervisor virtual machine controllers.

Responsive to determining that the third copy of the executable program is actively running, the first copy of the executable program is terminated (block 250). In an example, after hypervisor virtual machine controller 140 determines that hypervisor virtual machine controller 145 is successfully up and running, and handling new requests for hypervisor virtual machine controllers, hypervisor virtual machine controller 140 may self-terminate. In an example, hypervisor virtual machine controller 144 may be cloned from hypervisor virtual machine controller 145, and hypervisor virtual machine controller 144 may execute in the active mode to provide configuration settings for launching VM 116. In an example, ensuring that there is always at least one copy of hypervisor virtual machine controller running in the server mode (e.g., hypervisor virtual machine controller 140 or hypervisor virtual machine controller 145), the system 100 may ensure that each request for launching a new hypervisor virtual machine controller in active mode (e.g., hypervisor virtual machine controller 142 or hypervisor virtual machine controller 144) receives the launch speed boost by being launched via cloning rather than being launched directly. By alternately terminating the server mode hypervisor virtual machine controllers (e.g., hypervisor virtual machine controllers 140 and 145), the system ensures that ASLR is performed regularly on shared libraries associated with hypervisor virtual machine controllers, thereby alleviating the security risk of prelinking.

In further examples, preloading enhanced application startup may be advantageous for a variety of application types in a variety of environments. For example, applications 160, 162, 164 and 165 may be copies of a compiler. In an example, applications 160 and 165 may be executing in a server mode (e.g., listening for requests to launch active copies of the compiler), while applications 162 and 164 may be executing in an active mode (e.g., actively compiling code). In another example, applications 160, 162, 164 and 165 may each be a component part of one or more compilers. A user may retrieve uncompiled code from the internet, which may possibly contain malicious code. Rather than risk infecting a physical system, the user may wish to perform tests on the code in a virtual machine 112 that can be terminated if the code turns out to be malicious, with relatively little risk of infection to host OS 186 or other VMs of system 100 (e.g., VM 116). Desiring to test compile many such pieces of questionable code, it may be advantageous to launch application 160 in server mode listening for instructions on virtual socket 170. Application 160 may be an executable program such as a compiler that is then fed an instruction to compile a file containing questionable code. In an example, application 160 may fork itself with the file containing questionable code as an input variable to launch application 162, which may then compile the questionable code. Application 160 may fork itself again with a new file containing questionable code as an input variable to launch application 164 to compile the new file containing questionable code. Finally, application 160 may instruct guest OS 196A to launch application 165 listening on virtual socket 175 to replace application 160 as the server mode version of the application. In an example, upon confirmation that application 165 is listening for instructions on virtual socket 175, application 160 may be terminated.

Figure 3A:
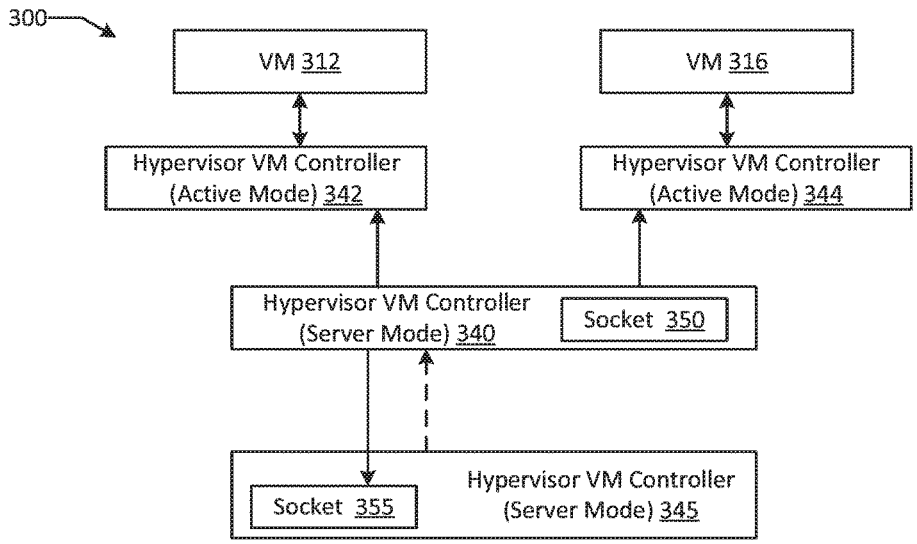
FIGS. 3A and 3B are block diagrams illustrating a transition between copies of an executable program executing in server mode in a system employing preloading enhanced application startup according to an example of the present disclosure.
Figure 3B:
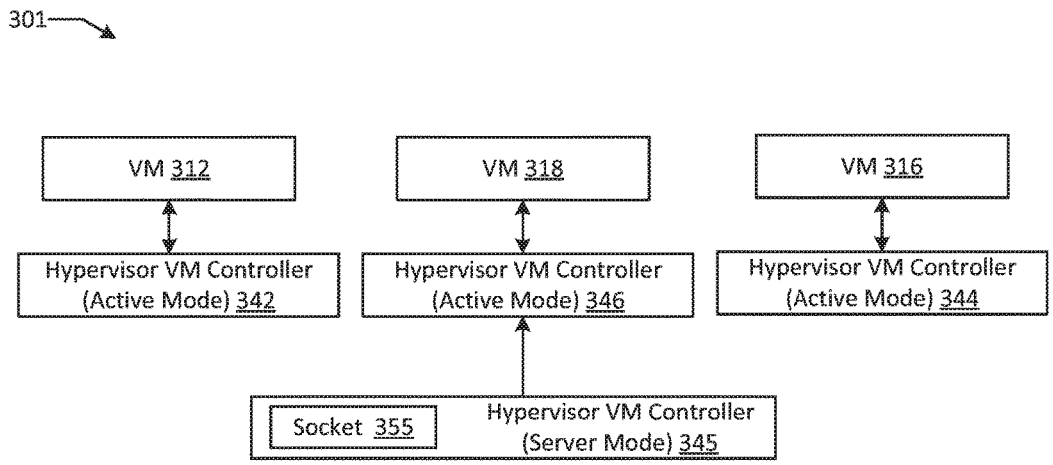

FIGS. 3A and 3B are block diagrams illustrating a transition between copies of an executable program executing in server mode in a system employing preloading enhanced application startup according to an example of the present disclosure. The system 300 depicts a system where a first copy of an executable program in server mode launches two copies of the executable program in active mode, and a second copy of the executable program in server mode. For example, hypervisor virtual machine controller (server mode) 340 listens for requests on socket 350. A first request may be to clone hypervisor virtual machine controller (server mode) 340 to launch hypervisor virtual machine controller (active mode) 342. In an example, after hypervisor virtual machine controller (server mode) 340 clones itself to launch hypervisor virtual machine controller (active mode) 342, hypervisor virtual machine controller (active mode) 342 then provides configuration settings to launch and manage VM 312. A second request may be to clone hypervisor virtual machine controller (server mode) 340 to launch hypervisor virtual machine controller (active mode) 344. In an example, after hypervisor virtual machine controller (server mode) 340 clones itself to launch hypervisor virtual machine controller (active mode) 344, hypervisor virtual machine controller (active mode) 344 then provides configuration settings to launch and manage VM 316. A determination may then be made that a new hypervisor virtual machine controller in server mode is necessary for maintaining high security against malicious actors, or because additional capacity is needed to handle a high volume of requests for new hypervisor virtual machine controllers. Hypervisor virtual machine controller (server mode) 340 may cause hypervisor virtual machine controller (server mode) 345 to be launched, with socket 355 being associated as a listening socket for hypervisor virtual machine controller (server mode) 345.

In an example, hypervisor virtual machine controller (server mode) 340 may query socket 355 to determine whether socket 355 is actively listening for new requests to launch active mode hypervisor virtual machine controllers. Upon determining that socket 355 is actively listening for requests, possibly based on a response from hypervisor virtual machine controller (server mode) 345, hypervisor virtual machine controller (server mode) 340 may then terminate itself. In an example after hypervisor virtual machine controller (server mode) 340 is terminated, hypervisor virtual machine controller (server mode) 345 may then receive a request to launch hypervisor virtual machine controller (active mode) 346 by cloning itself resulting in system 300 becoming system 301. Hypervisor virtual machine controller (server mode) 345 may then clone itself to launch hypervisor virtual machine controller (active mode) 346, resulting in three active mode hypervisor virtual machine controllers 342, 344 and 346 being up and running in the active mode. Hypervisor virtual machine controller (active mode) 346 may also provide configuration settings for the launching of VM 318. Hypervisor virtual machine controller (server mode) 345 may continue running until it detects that a new hypervisor virtual machine controller (server mode) is listening on port 350 vacated when hypervisor virtual machine controller (server mode) 340 terminated.

Figure 4:
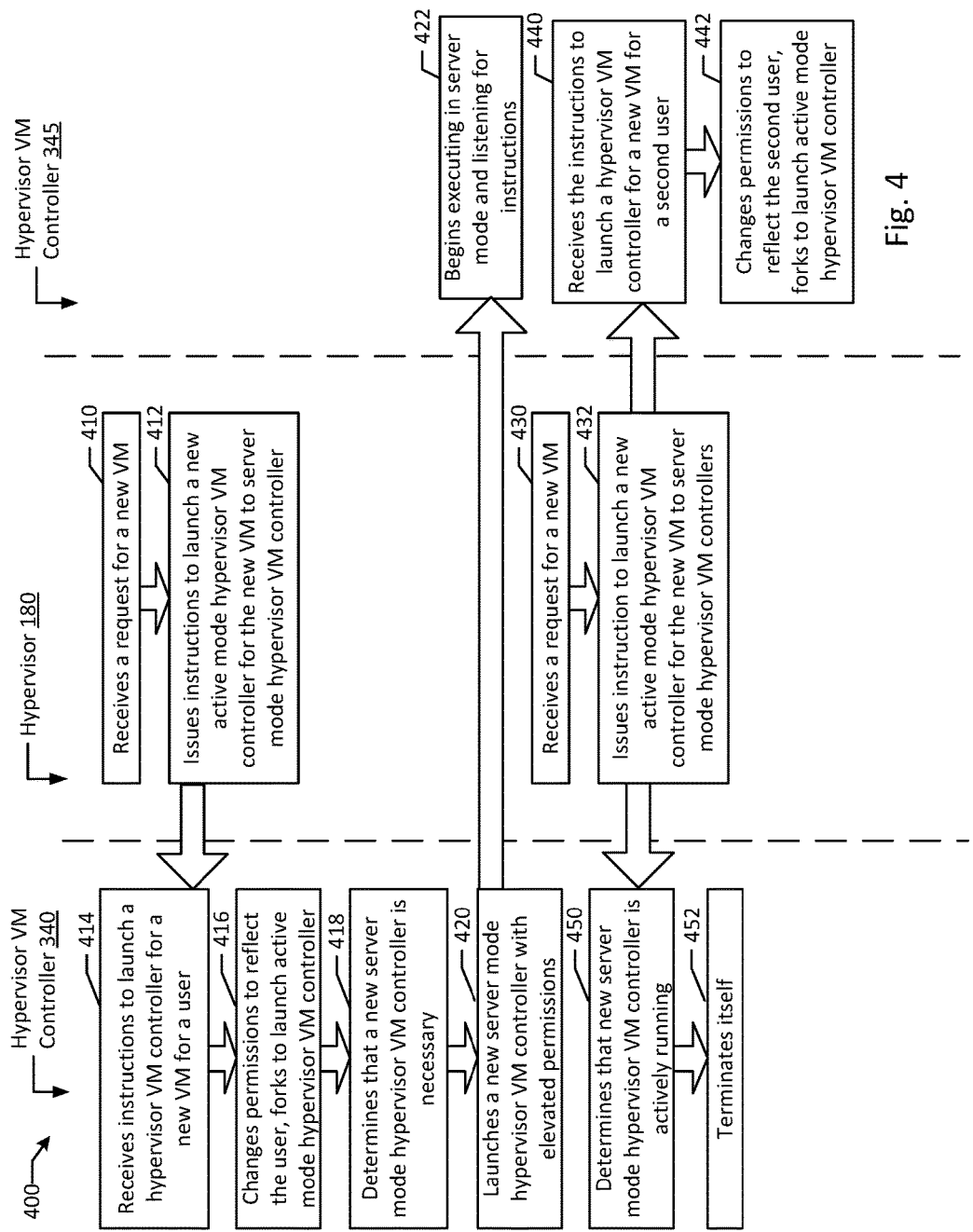
FIG. 4 is a flow diagram illustrating an example system employing preloading enhanced application startup according to an example of the present disclosure.

FIG. 4 is a flow diagram illustrating an example system employing preloading enhanced application startup according to an example of the present disclosure. Although the examples below are described with reference to the flowchart illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 400, a hypervisor virtual machine controller 340 is employing preloading enhanced application startup in conjunction with hypervisor 180 and hypervisor virtual machine controller 345.

Hypervisor 180 may receive a request to launch a new VM (block 410). As a result of the request, hypervisor 180 may issue instructions to launch a new active mode hypervisor virtual machine controller for the new VM to hypervisor virtual machine controller 340 executing in the server mode (block 412). In an example, hypervisor 180 may issue instructions to hypervisor virtual machine controller 340 to launch a new hypervisor virtual machine controller in the active mode for configuring a new VM for a specific user. In another example, hypervisor 180 may generate instructions for hypervisor virtual machine controller 340 based on environment settings associated with a user account requesting the new VM, and may pass the instructions including argv and env values to hypervisor virtual machine controller 340 via socket 350. In an example, hypervisor virtual machine controller 340 receives instructions to launch a hypervisor virtual machine controller for a new VM for the user (block 414). In the example, hypervisor virtual machine controller 340 may change its own permissions to reflect those of the user, and fork itself to launch an active mode hypervisor virtual machine controller (block 416). For example, hypervisor virtual machine controller 340 may fork itself to launch hypervisor virtual machine controller 342. In an example, by forking itself, hypervisor virtual machine controller 340 creates a new process (e.g., hypervisor virtual machine controller 342), with a new separate address space in memory with an exact copy of all of the memory segments of the parent process (e.g., hypervisor virtual machine controller 340), including all preloaded shared libraries. In an example, the copy operation may be a copy on write application, where the memory segments of hypervisor virtual machine controller 340 are instead flagged as copy on write, avoiding a requirement to actually rewrite all of the memory segments of hypervisor virtual machine controller 340 to memory again unless they are changed by either hypervisor virtual machine controller 340 or hypervisor virtual machine controller 342. In the example, the shared libraries required by hypervisor virtual machine controller 342 to execute its tasks may be initialized based on argv and env values passed to hypervisor virtual machine controller 342. The new child process for hypervisor virtual machine controller 342 may then execute the hypervisor virtual machine controller executable program resulting in hypervisor virtual machine controller 342 executing in active mode with shared libraries preloaded. In other examples, hypervisor virtual machine controller 342 may be launched as a child process of hypervisor virtual machine controller 340 through various related system operations to fork( ) such as clone( ) spawn( ) or CreateProcess( ).

In an example, after launching hypervisor virtual machine controller 342, hypervisor virtual machine controller 340 may make a determination whether a new hypervisor virtual machine controller executing in server mode is necessary. For example, the determination may be made based on a quantity of child hypervisor virtual machine controllers (e.g., hypervisor virtual machine controller 342) launched by hypervisor virtual machine controller 340, or an uptime for the hypervisor virtual machine controller 340 process. In an example, hypervisor virtual machine controller 340 determines that a new server mode hypervisor virtual machine controller is necessary (block 418). In an example, hypervisor virtual machine controller 340 determines that after having been cloned a predetermined quantity of times (e.g., ten times) to launch hypervisor virtual machine controllers in the active mode, a new server mode hypervisor virtual machine controller is required for security purposes. In the example, hypervisor virtual machine controller 340 may launch a new server mode hypervisor virtual machine controller with elevated permissions (block 420). For example, hypervisor virtual machine controller 345 may be launched with root permissions rather than the permissions for the user account that requested hypervisor virtual machine controller 342. In an example, rather than being a forked or cloned copy of hypervisor virtual machine controller 340, hypervisor virtual machine controller 345 may be launched as an entirely separate process to refresh ASLR for the locations in memory where the shared libraries for hypervisor virtual machine controllers are loaded. After being launched, hypervisor virtual machine controller 345 may begin executing in server mode and listening for instructions (block 422). For example, hypervisor virtual machine controller 345 may bind a socket 355 to listen for instructions.

In an example, hypervisor 180 receives a second request for a new VM (block 430). In the example, hypervisor 180 may look up in a configuration file that sockets 350 and 355 are both associated with server mode hypervisor virtual machine controllers (e.g., hypervisor virtual machine controllers 340 and 345). The hypervisor 180 may issue instructions to launch a new active mode hypervisor virtual machine controller for the new VM to the server mode hypervisor virtual machine controllers (block 432). In the example, hypervisor 180 may send the instructions to both sockets 350 and 355. In an example, hypervisor 180 may await the first acknowledgement from either hypervisor virtual machine controller 340 or hypervisor virtual machine controller 345 before cancelling its instructions to the later responder.

In an example, hypervisor virtual machine controller 345 receives the instructions to launch a hypervisor virtual machine controller in the active mode for the new VM for a second user (block 440). In the example, hypervisor virtual machine controller 345 may change its own permissions to reflect the second user's permissions and fork itself to launch a new active mode hypervisor virtual machine controller (block 442). In the example, hypervisor virtual machine controller 346 executing in the active mode may be launched as a child of hypervisor virtual machine controller 345. In an example, hypervisor virtual machine controller 346 executing in the active mode may then provide configuration information for the launch of VM 318 for the second user. In an example, hypervisor virtual machine controller 345 may then revert to its original unaltered state with elevated rights.

In the above example, hypervisor virtual machine controller 340 may determine that the new server mode hypervisor virtual machine controller is actively running (block 450). Hypervisor virtual machine controller 340 may determine that hypervisor virtual machine controller 345 is actively running in a variety of ways. For example, hypervisor virtual machine controller 340 may send a request to socket 355 and make a determination based on a response received from hypervisor virtual machine controller 345. In another example, hypervisor virtual machine controller 340 may check the process table of system 300 to determine if hypervisor virtual machine controller 345 is actively running. In yet another example, hypervisor 180 may send a message to socket 350 that it has received an acknowledgement from hypervisor virtual machine controller 345 that hypervisor virtual machine controller 345 would handle the task of launching hypervisor virtual machine controller 346. In response to determining that hypervisor virtual machine controller 345 is actively running, hypervisor virtual machine controller 340 may terminate itself (block 452). In an example, prior to self termination, hypervisor virtual machine controller 340 may send a notice to hypervisor virtual machine controller 345 and/or hypervisor 180 that hypervisor virtual machine controller 340 will self terminate. In an example, responsive to hypervisor virtual machine controller 340's notification of self termination, hypervisor virtual machine controller 345 may start incrementing a counter for an elapsed time or elapsed quantity of child hypervisor virtual machine controllers (e.g., hypervisor virtual machine controller 346) launched before hypervisor virtual machine controller 345 launches a new server mode hypervisor virtual machine controller associated with socket 350 to replace hypervisor virtual machine controller 340.

Figure 5:
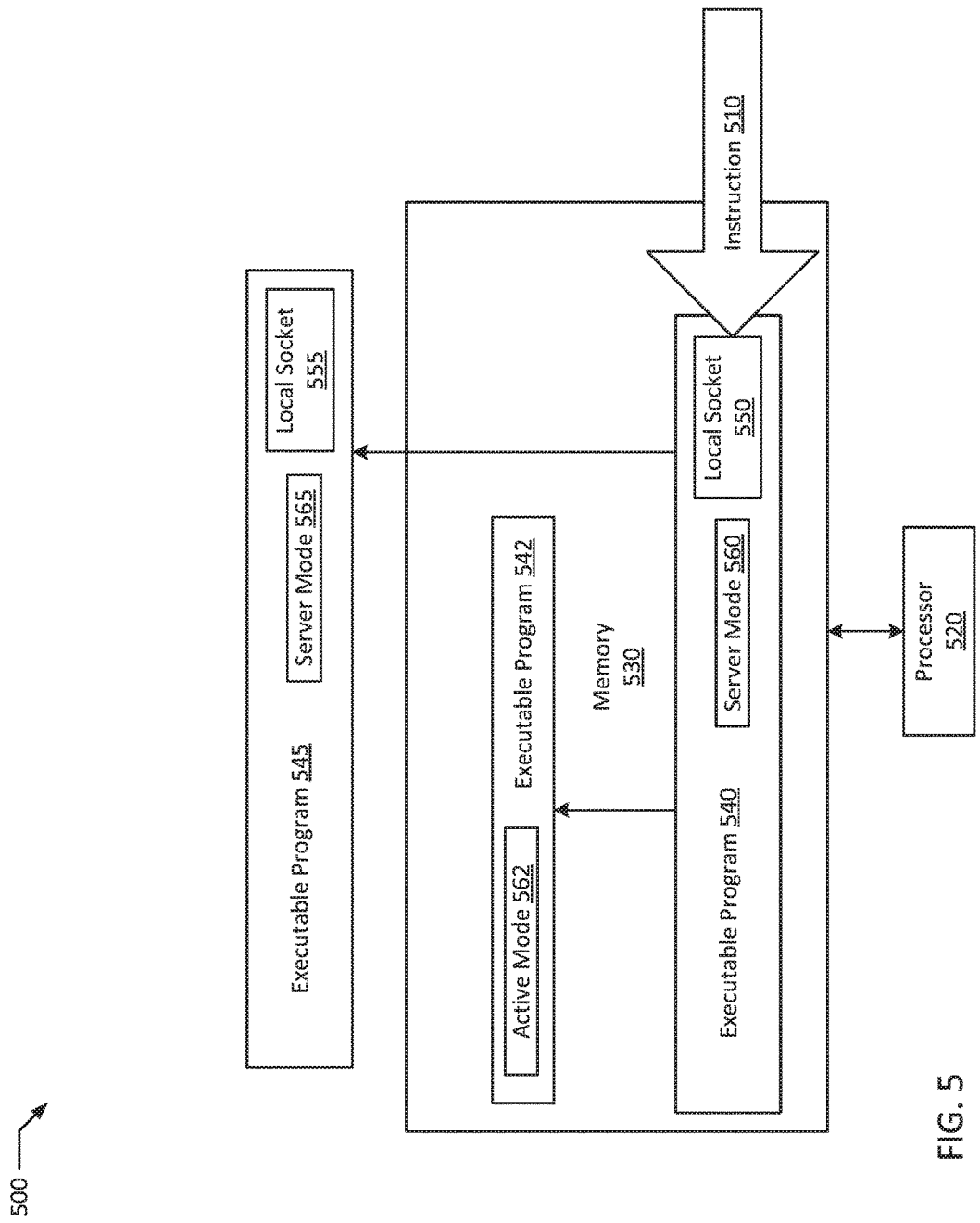
FIG. 5 is a block diagram of a system employing preloading enhanced application startup according to an example of the present disclosure.

FIG. 5 is a block diagram of a system employing preloading enhanced application startup according to an example of the present disclosure. Example system 500 may include a memory 530 and a processor 520, with a first copy of an executable program (e.g., executable program 540) loaded in the memory 530, where the executable program 540 executes in either a server mode or an active mode. In an example, executable program 540 executes in server mode 560 on processor 520 to receive instruction 510 from local socket 550. In an example, local socket 550 may be exclusively associated with executable program 540. In an example, instruction 510 is an instruction to launch a second copy of the executable program (e.g., executable program 542). In an example, executable program 540 is cloned to launch executable program 542, and executable program 542 is launched in the active mode 562. In an example, executable program 542 is also stored in memory 530 because it is a clone of executable program 540 made via a copy on write process, so executable program 542 may share at least some of the same memory segments of memory 530 with executable program 540.

In an example, executable program 540 launches a third copy of the executable program (e.g., executable program 545) in the server mode 565 and executable program 545 is associated with local socket 555. In the example, executable program 540 may determine that executable program 545 is actively running. Responsive to determining that executable program 545 is actively running, executable program 540 may terminate itself.

In some examples, an executable program executing in server mode may also process operational tasks the executable program is designed to perform, other than launching active mode copies of the executable program. For example, so long as the executable program continues to listen for instructions to clone itself to create new copies, and the executable program can pause its current task to create the new copies, it may be executing in server mode. In such examples, being in server mode may not exclude a copy of an executable program from performing active mode tasks. In an example, a distinguishing feature of the executable program executing in active mode may be a lack of the binding of a socket for listening for instructions to clone further copies. In an example, the executable program may clone a smaller portion of itself rather than the whole executable program in response to an instruction to clone. For example, where a hypervisor is the executable program, cloning a component part such as a hypervisor virtual machine controller in response to an instruction to the hypervisor would be an example of preloading enhanced application startup. In such an example, they hypervisor virtual machine controller may be incapable of freestanding operation without being a part of the hypervisor.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory and a processor on a host;
a first copy of an executable program loaded in the memory at a first time, executing in a server mode on the processor to:
receive, by a first local socket associated with the first copy of the executable program, a first instruction to launch a second copy of the executable program, wherein the first copy of the executable program executing in the server mode preloads a plurality of shared libraries associated with the executable program to the memory and awaits instructions to launch additional copies of the executable program over the first local socket;
clone the first copy of the executable program to launch the second copy of the executable program, wherein the second copy of the executable program launches in an active mode, with a memory address space that includes the preloaded plurality of shared libraries, and the second copy of the executable program in the active mode performs processing tasks using the preloaded plurality of shared libraries;
launch, at a second time after the first time, a third copy of the executable program in the server mode, the third copy of the executable program being associated with a second local socket;
determine that the third copy of the executable program is running in the server mode; and
responsive to determining that the third copy of the executable program is running in the server mode, terminate the first copy of the executable program, wherein the third copy of the executable program executes to preload shared libraries of the plurality of shared libraries to different memory addresses from the first copy of the executable program,
wherein the executable program is at least a part of one of a hypervisor and a compiler.

2. The system of claim 1, wherein the first copy of the executable program is launched as part of a startup routine of the system.

3. The system of claim 1, wherein the first copy of the executable program is launched based on a request to execute the executable program.

4. The system of claim 3, wherein the first copy of the executable program, upon launching in the server mode, immediately launches a fourth copy of the executable program in the active mode to handle the request to execute the executable program.

5. The system of claim 1, wherein a determination that the third copy of the executable program is running in the server mode is based on determining that the second local socket is actively listening.

6. The system of claim 1, wherein the first instruction includes at least one of an argument value and an environment value passed to the second copy of the executable program.

7. The system of claim 1, wherein the second copy of the executable program launches with a more restrictive permission than the first copy of the executable program.

8. The system of claim 1, wherein at least one shared library of the plurality of shared libraries associated with the executable program is initialized prior to the second copy of the executable program being launched.

9. The system of claim 1, wherein at least one shared library of the plurality of shared libraries associated with the executable program is initialized based on an environment value associated with the second copy of the executable program.

10. The system of claim 1, wherein launching the third copy of the executable program includes performing address space layout randomization.

11. The system of claim 1, wherein the first local socket and the second local socket are associated with the executable program in at least one of a configuration file, an environment value, and a path.

12. The system of claim 11, wherein the second instruction is sent to the second local socket after the first local socket has been determined to be unresponsive.

13. The system of claim 1, wherein a second instruction is sent to both the first local socket and the second local socket.

14. The system of claim 1, wherein the executable program is a hypervisor virtual machine controller, and the hypervisor virtual machine controller is associated with configuration settings for a virtual machine.

15. The system of claim 1, wherein the first socket and the second socket are different sockets.

16. The system of claim 1, wherein the third copy of the executable program is launched in response to at least one of an elapsed time and a quantity of instructions handled by the first copy of the executable program.

17. A method comprising:
receiving, by a first local socket associated with a first copy of an executable program loaded in a memory, a first instruction to launch a second copy of the executable program, wherein the first copy of the executable program executes in a server mode, and the first copy of the executable program is loaded in the memory at a first time, and wherein the first copy of the executable program executing in the server mode preloads a plurality of shared libraries associated with the executable program to the memory and awaits instructions to launch additional copies of the executable program over the first local socket;
cloning the first copy of the executable program to launch the second copy of the executable program, wherein the second copy of the executable program launches in an active mode, with a memory address space that includes the preloaded plurality of shared libraries, and the second copy of the executable program in the active mode performs processing tasks using the preloaded plurality of shared libraries;
in response to at least one of an elapsed time and a quantity of instructions handled by the first copy of the executable program, launching, at a second time after the first time, a third copy of the executable program in the server mode, the third copy of the executable program being associated with a second local socket;
determining that the third copy of the executable program is running in the server mode; and
responsive to determining that the third copy of the executable program is running in the server mode, terminating the first copy of the executable program, wherein the third copy of the executable program executes to preload shared libraries of the plurality of shared libraries to different memory addresses from the first copy of the executable program.

18. A computer-readable non-transitory storage medium storing executable instructions, which when executed by a computer system, cause the computer system to:
receive, by a first local socket associated with a first copy of an executable program loaded in a memory, a first instruction to launch a second copy of the executable program, wherein the first copy of the executable program executes in a server mode, and the first copy of the executable program is loaded in the memory at a first time, and wherein the first copy of the executable program executing in the server mode preloads a plurality of shared libraries associated with the executable program to the memory and awaits instructions to launch additional copies of the executable program over the first local socket;
clone the first copy of the executable program to launch the second copy of the executable program, wherein the second copy of the executable program launches in an active mode, with a memory address space that includes the preloaded plurality of shared libraries, and the second copy of the executable program in the active mode performs processing tasks using the preloaded plurality of shared libraries;
launch, at a second time after the first time, a third copy of the executable program in the server mode, the third copy of the executable program being associated with a second local socket;
determine that the third copy of the executable program is running in the server mode; and
responsive to determining that the third copy of the executable program is running in the server mode, terminate the first copy of the executable program, wherein the third copy of the executable program executes to preload shared libraries of the plurality of shared libraries to different memory addresses from the first copy of the executable program,
wherein the executable program is at least a part of one of a hypervisor and a compiler.

19. The system of claim 1, wherein the first copy of the executable program is configured to execute in the server mode with elevated permissions, and
the second copy of the executable program is configured to execute in the active mode with user permissions and the second copy of the executable program is further configured to copy-on-write memory resources of the first copy of the executable program.

* * * * *